No. 636,020. Patented Oct. 31, 1899.
E. A. WHORLEY.
TETHER.
(Application filed Dec. 15, 1898.)
(No Model.)

Witnesses
E. A. Whorley, Inventor.
By his Attorneys,

UNITED STATES PATENT OFFICE.

EUGENE A. WHORLEY, OF ROANOKE, VIRGINIA.

TETHER.

SPECIFICATION forming part of Letters Patent No. 636,020, dated October 31, 1899.

Application filed December 15, 1898. Serial No. 699,343. (No model.)

*To all whom it may concern:*

Be it known that I, EUGENE A. WHORLEY, a citizen of the United States, residing at Roanoke, in the county of Roanoke and State of Virginia, have invented a new and useful Tether, of which the following is a specification.

The invention relates to improvements in tethers.

The object of the present invention is to improve the construction of tethers and to provide a simple, inexpensive, and efficient one adapted to permit a horse or other animal to graze freely within a limited area and to prevent the tethering or hitching rope from becoming entangled in its legs or wrapped around the stake or post.

A further object of the invention is to provide a tether of this character which will be adapted to be readily adjusted to enable ropes of different lengths to be employed, so that an animal may be permitted to graze over an area of the desired extent.

The invention consists in the construction and novel combination and arrangement of parts hereinafter fully described, illustrated in the accompanying drawings, and pointed out in the claim hereto appended.

Figure 1:
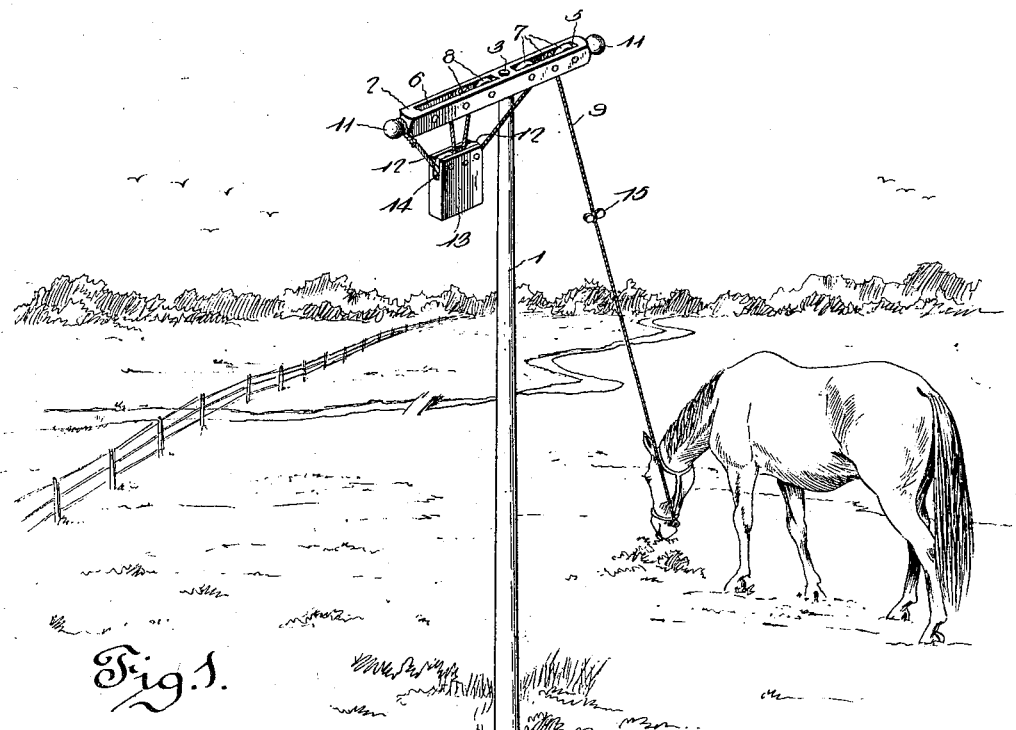
Figures 2, 3:
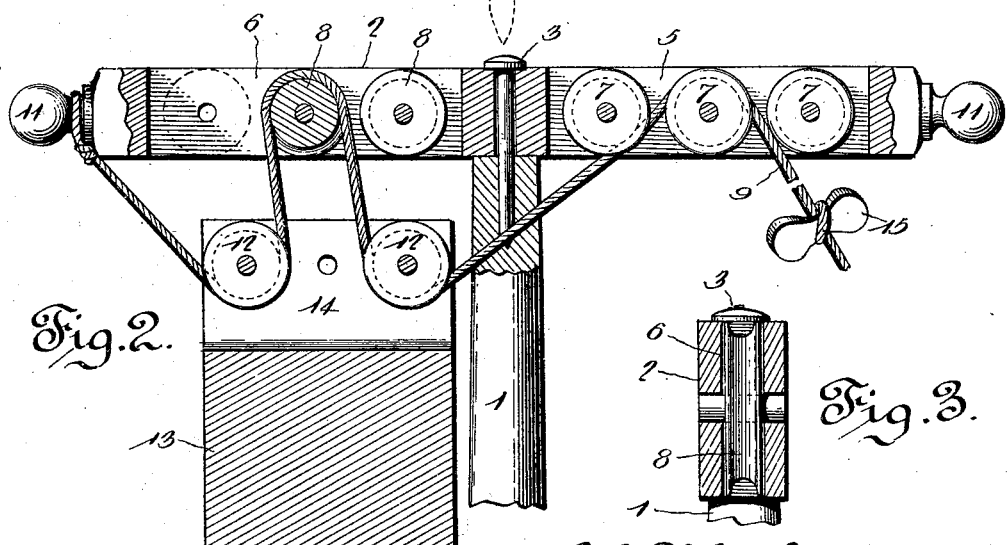

In the drawings, Figure 1 is a perspective view of a tether constructed in accordance with this invention. Fig. 2 is a vertical sectional view of the upper portion thereof, the weight being arranged adjacent to the horizontal pivoted bar. Fig. 3 is a transverse sectional view of the pivoted bar.

Like numerals of reference designate corresponding parts in all the figures of the drawings.

1 designates a post or stake designed to be driven into the ground and forming a support for a horizontally-swinging bar 2, which is pivotally mounted upon the upper end of the post or stake by means of a bolt 3 or other suitable fastening device. The bolt 3, which secures the horizontal bar 2 to the support, is arranged at the center of the former, and the said bar, which is adapted to turn freely to yield to the movements of the tethered animal, is provided at opposite sides of its center with longitudinal recesses or slots 5 and 6, receiving pulleys 7 and 8, on which is arranged a tethering-rope 9. The tethering-rope 9 is secured at one end to the bar 2, which is preferably provided with knobs 11, as shown, and the said rope has its free end depending from the other end of the bar, and it passes over one of the pulleys 7. The pulleys 7, which are three in number, are mounted on suitable pivots within the longitudinal recess 5, the central pulley 7 being for the reception of the tethering-rope, and the other pulleys 7, which are located at opposite sides of the central one, forming guides to prevent the rope from coming in contact with the shoulders or edges formed by recessing the bar 2. The other recess 6 of the bar 2 receives three pulleys 8, which are mounted on suitable fastening devices and which are adapted to be readily removed. Although only two pulleys are shown in the drawings in the recess 6, yet it will be apparent that the three referred to may be employed, and the capacity of the slot or recess may be increased, if desired. The pulleys 8 of the recess or opening 6 cooperate with pulleys 12 of a weight 13, provided at its top with a slot or recess for the reception of the said pulleys 12, which are removable, similar to the pulleys 8. The recess or opening 14 of the weight is adapted to receive three pulleys, similar to the recess or opening 6, and these pulleys 8 and 12 are adapted to permit the tethering-rope to be reeved around them and extended back and forth from the weight to the adjacent end of the bar 2 and permit any desired number of the runs of the rope to be made. By varying the number of runs of the rope between the weight and the bar 2 tethering-ropes of different lengths may be employed and the grazing area open to a tethered animal may be varied.

The weight is adapted to hold the tethering-rope taut between the animal and the bar 2, and as it is located at one end of the bar and at one side of the post or support while the tethered animal is at the other side there is no liability of the animal coming in contact with the weight, and as the rope is reeved back and forth over the pulleys it will be clear that the weight exerts but very little strain on the head of the animal.

The free end of the rope is designed to be secured to the halter of an animal, and a suitable stop 15, applicable to any desired point on the rope, is provided to limit the upward movement of the tethering-rope, so as to relieve the head of the animal of the strain exerted by the weight when the rope is drawn in sufficiently to prevent it from becoming entangled in the feet of the animal.

The tether, which is simple and comparatively inexpensive in construction, is strong and durable, and as the bar 2 is capable of rotating horizontally an animal is permitted to graze around a post without wrapping the tethering-rope thereon. The tethering-rope permits the animal to move freely to and from the post or support without becoming entangled in its feet, and the removable pulleys enable the tethering-rope to be reeved back and forth between the bar and the weight the desired number of times, so that ropes of different lengths may be employed.

By reference to Fig. 2 it will be seen that one end of the tethering-rope is permanently attached to one end of the bar 2, from which it passes under one of the pulleys on the weight and thence upward over one of the pulleys 8 on the same arm of the bar 2, to which the rope is attached at one end. The rope passes thence downward under the remaining pulley on the weight and thence obliquely across the supporting-post 1, and finally over one of the pulleys 7 on the other arm of the horizontal bar 2. By this arrangement the several strands of the tethering-rope are kept separated, the object of which is to prevent the weight from twisting and entangling or twisting the several strands or lengths of the rope upon each other, which would of course temporarily render the device inoperative. The relative disposition of the pulleys on the horizontal bar and on the weight in connection with the manner of reeving the rope around the same thus insures the parts being kept in operative condition and relation, as it will be impossible for the several lengths of the tethering-rope to become twisted.

Changes in the form, proportion, and minor details of construction may be resorted to without departing from the spirit or sacrificing any of the advantages of this invention.

What is claimed is—

In a tether, the combination with the supporting-post, of a horizontal bar centrally and pivotally mounted thereon to revolve on a vertical axis, and having longitudinally-alined slots at opposite sides of the pivotal point, two series of pulleys housed within the slotted portions of said bar, a weight having a recess in its upper portion, pulleys journaled in said recess and set at a distance from each other in the same horizontal plane, a tethering-rope having one end secured to one end of the horizontal bar and passed thence under one pulley on the weight, thence over a pulley on the adjacent arm of the bar, thence under another pulley on the weight, and finally across the supporting-post and over a pulley on the other arm of the bar, and a stop detachably connected to said rope.

In testimony that I claim the foregoing as my own I have hereto affixed my signature in the presence of two witnesses.

EUGENE A. WHORLEY.

Witnesses:
LAWRENCE S. DAVIS,
A. J. LOUGHERY.